United States Patent
Yoo et al.

(10) Patent No.: US 11,978,946 B2
(45) Date of Patent: May 7, 2024

(54) CLAMPING APPARATUS FOR ANTENNA

(71) Applicant: KMW INC., Hwaseong-si (KR)

(72) Inventors: Chang Woo Yoo, Hwaseong-si (KR);
Kyo Sung Ji, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 248 days.

(21) Appl. No.: 17/496,938

(22) Filed: Oct. 8, 2021

(65) Prior Publication Data
US 2022/0029270 A1      Jan. 27, 2022

Related U.S. Application Data (63) Continuation of application No. PCT/KR2020/004660, filed on Apr. 7, 2020.

(30) Foreign Application Priority Data

Apr. 10, 2019    (KR) .................. 10-2019-0042104
Oct. 30, 2019    (KR) .................. 10-2019-0136754

(51) Int. Cl.
*H01Q 1/12*        (2006.01)
*F16B 2/06*        (2006.01)

(52) U.S. Cl.
CPC ........... *H01Q 1/1228* (2013.01); *F16B 2/065* (2013.01); *H01Q 1/1242* (2013.01)

(58) Field of Classification Search
CPC .... H01Q 1/1228; H01Q 1/1242; H01Q 1/246; H01Q 1/1207; H01Q 3/08; F16B 2/065;
(Continued)

(56) References Cited

U.S. PATENT DOCUMENTS 5,787,673 A * 8/1998 Noble .................. H01Q 1/1242
52/114
7,880,682 B2   2/2011 Fruh et al.

FOREIGN PATENT DOCUMENTS

CN      10-6329059 A     1/2017
CN      106329059 A      1/2017
(Continued)

OTHER PUBLICATIONS

Indian office action dated Mar. 16, 2022 for Indian Application No. 202117049135.
(Continued)

*Primary Examiner* — Awat M Salih
(74) *Attorney, Agent, or Firm* — Insight Law Group, PLLC; Seung Lee (57) ABSTRACT

The present disclosure relates to a clamping apparatus for an antenna, and more particularly, to a clamping apparatus for an antenna including: an arm unit coupled to a support pole and having an upwardly open rotating shaft hole formed in a front end thereof; a rotation unit detachably mounted to the rotating shaft hole of the arm unit and coupled to be rotatable about the rotating shaft hole at a predetermined angle in a left-right direction; and a tilting unit detachably mounted to a tilting shaft hole of the front end of the rotation unit, and coupled to be tiltable about the tilting shaft hole at a predetermined angle in a top-down direction, wherein the rotation unit is configured such that a rotating shaft rod serving as the center of the rotating motion is rotatably fixed to the arm unit through a rotating coupling member, and the tilting unit is configured such that the tilting shaft rod serving as the center of the tilting motion is tiltably fixed to the rotation unit through a tilting coupling member. Thus, the present disclosure provides an advantage of eliminating
(Continued)

spatial limitations of a plurality of antenna devices on the support pole and an advantage of improving workability.

11 Claims, 9 Drawing Sheets

(58) Field of Classification Search
CPC .... F16M 11/10; F16M 11/2014; F16M 11/22; F16M 2200/022
See application file for complete search history.

(56) References Cited

FOREIGN PATENT DOCUMENTS

| | | |
|---|---|---|
| CN | 20-7798942 U | 8/2018 |
| JP | H07-307606 A | 11/1995 |
| JP | 3057002 U | 12/1998 |
| JP | H11-177320 A | 7/1999 |
| JP | 2006-211110 A | 8/2006 |
| JP | 2013-247684 A | 12/2013 |
| JP | 2017-143408 A | 8/2017 |
| KR | 10-2005-0026461 A | 3/2005 |
| KR | 20-0421716 Y1 | 7/2006 |
| KR | 10-1621892 A | 5/2016 |
| KR | 10-1621892 B1 | 5/2016 |
| KR | 10-1962767 B1 | 3/2019 |

OTHER PUBLICATIONS

Extended European Search Report dated Dec. 20, 2022 for European Application No. 20787793.7.
Japanese Office Action dated Nov. 8, 2022 for Japanese Application No. 2021-559679.
International Search Report dated Jul. 13, 2020 for International Application No. PCT/KR2020/004660 and its English translation.
Non-final Office Action dated Aug. 3, 2023 for Korea Application No. 10-2019-0136754.

* cited by examiner

CLAMPING APPARATUS FOR ANTENNA

CROSS-REFERENCE TO RELATED APPLICATIONS

This application is a continuation application of International Application No. PCT/KR2020/004660, filed Apr. 7, 2020, which claims the benefit of Korean Patent Application Nos. 10-2019-0042104, filed Apr. 10, 2019, and 10-2019-0136754, filed Oct. 30, 2019, in the Korean Intellectual Property Office, the disclosures of which are incorporated herein in their entirety by reference.

TECHNICAL FIELD

The present disclosure relates to a clamping apparatus for an antenna, and more particularly, to a clamping apparatus for an antenna, in which an antenna device can be efficiently disposed in a compact installation space as well as a direction of the antenna device is easily adjusted.

BACKGROUND ART

Wireless communication technology, for example, multiple-input multiple-output (MIMO) technology is technology that remarkably increases a data transmission capacity using multiple antennas, and is a spatial multiplexing technique for transmitting different data through each transmitting antenna at a transmitter and for sorting the transmitted data through adequate signal processing at a receiver.

Therefore, by simultaneously increasing the number of transmitting antennas and the number of receiving antennas, a channel capacity is increased, and more data can be transmitted. For example, if the number of antennas is increased to ten, a channel capacity of about ten times is secured using the same frequency band compared to a current single antenna system.

In 4G LTE-Advanced, eight antennas are used, and products in which 64 or 128 antennas are mounted in a pre-5G step are developed at present. It is expected that base station equipment having far more antennas will be used in 5G, which is referred to as Massive MIMO technology. A current cell operation is of two dimensions, whereas, if the Massive MIMO technology is introduced, 3D-Beamforming is possible, thus being also referred to as full dimension (FD)-MIMO.

In the Massive MIMO technology, as the number of antennas (ANTs) increases, the number of transmitters and the number of filters are increased together. However, due to lease expenses of an installation space or spatial limitations, RF elements (antenna/filter/power amplifier/transceiver, etc.) are actually made small, light, and inexpensive. Massive MIMO requires a high output for coverage expansion, and power consumption and a heating value caused by the high output act as negative factors in reducing weight and a size.

Especially, when a MIMO antenna, in which modules implemented by RF elements and digital elements are coupled in a layered structure, is installed in a restricted space, the necessity for compact and miniature design of a plurality of layers constituting the MIMO antenna in order to maximize installation easiness or spatial applicability is rising, and the necessity for free direction adjustment of an antenna device installed on one support pole is strongly requested.

DISCLOSURE

Technical Problem

An object of the present disclosure is to provide a clamping apparatus for an antenna which can increase a degree of freedom of installation with respect to a support pole having many spatial limitations and improve workability.

Technical Solution

An embodiment of a clamping apparatus for an antenna according to the present disclosure includes: an arm unit that is coupled to a support pole and has an upwardly open rotating shaft hole formed in a front end thereof; a rotation unit that is detachably mounted in the rotating shaft hole of the arm unit and is coupled to be rotatable about the rotating shaft hole at a predetermined angle in a left-right direction; and a tilting unit which is detachably coupled to a tilting shaft hole of a front end of the rotation unit and is coupled to be tiltable about the tilting shaft hole at a predetermined angle in an up-down direction, wherein the rotation unit is configured such that a rotating shaft rod serving as the center of a rotating motion is rotatably fixed to the arm unit via a rotating coupling means, and wherein the tilting unit is configured such that a tilting shaft rod serving as the center of a tilting motion is tiltably fixed to the rotation unit via a tilting coupling means.

Here, the rotating coupling means may include a rotating fixing bolt that passes through a rotating central hole formed to pass through the rotating shaft rod and is fixed and fastened to the arm unit.

Moreover, the rotating fixing bolt may be fastened and fixed to the arm unit corresponding to an interior of the rotating shaft hole.

Moreover, the tilting coupling means may include a tilting fixing bolt that passes through a tilting central hole formed to pass through the tilting shaft rod and is fixed and fastened to the rotation unit.

Moreover, the tilting fixing bolt may be fastened and fixed to the rotation unit corresponding to an interior of the tilting shaft hole.

Moreover, the rotation unit may include: a tilting unit installing stage to which the tilting unit is tiltably coupled; and a rotating block at which the rotating shaft rod inserted into and seated in the rotating shaft hole of the arm unit is formed, and the rotating block may have a rotating guide formed in a slot hole shape on the same circumference centering on the rotating shaft rod so as to guide the rotating motion of the rotation unit.

Moreover, the tilting unit may include: an antenna coupling stage that is coupled with the antenna device; and a tilting coupling stage that is coupled to come into surface contact with a lateral surface of a front end of the rotation unit, and the tilting coupling stage may have a tilting guide formed in a slot hole shape on the same circumference centering on the tilting shaft rod so as to guide the tilting motion of the tilting unit.

Moreover, the arm unit may include: an outer mounting block that is disposed to come into close contact with one side of an outer circumferential surface of the support pole; an inner mounting block that is disposed to come into close contact with the other side of the outer circumferential surface of the support pole and is fixed with the outer mounting block by at least one fixing bolt; and a clamp arm that extends from the inner mounting block at a predetermined length in a direction orthogonal to the support pole and constitutes a front end in which the rotating shaft hole is provided.

Moreover, at least one reinforcement rib may be formed at a connection portion between the inner mounting block and the clamp arm of the arm unit.

Moreover, a rotating angle label, which indicates a position of the rotating guide bolt moved relatively in the rotating guide slot from a reference point by an angle, may be attached to an upper surface of the rotating block.

Moreover, the antenna coupling stage may come into surface contact with a plurality of places of any one of a rear surface and a lateral surface of the antenna device, and may be fastened and fixed to fastening holes, which are formed in the plurality of places of any one of the rear surface and the lateral surface of the antenna device, via a fastening means.

In addition, the support pole may include: multiple support rods that slantly extend downward from an outer circumferential surface of the support poleand are radially spaced apart from one another at a predetermined angle; and support panels that are provided at tips of the multiple support rods and are supported and coupled to a ground or a wall.

Advantageous Effects

According to an embodiment of the clamping apparatus for an antenna according to the present disclosure, tilting and rotating motions of an antenna device are facilitated through a tilting unit and a rotation unit, and thus workability and frequency yield performance of the antenna device can be improved.

DESCRIPTION OF REFERENCE NUMERALS

1: support pole 3: multiple support rods
5: support panel 50: clamping apparatus for antenna
100: tilting unit 101: antenna coupling stage
103: tilting coupling stage 107: reinforcement rib
109: tilting guide 135: tilting guide bolt
140: tilting shaft rod 200: rotation unit
210: tilting unit installing stage 220: rotating block
230: rotating shaft rod 300: arm unit
310: outer mounting block 311: outer bolt through-hole
320: inner mounting block 323: inner shape-fitting recess
325: fixing bolt 330: clamp arm
331: rotating shaft hole 343: outer shape-fitting recess
360: fastening nut

BEST MODE

Hereinafter, an embodiment of a clamping apparatus for an antenna according to the present disclosure will be described in detail with reference to the accompanying drawings. In adding reference numerals to the elements of each drawing, it should be noted that the same elements have the same reference numerals as much as possible even if they are displayed in different drawings. Moreover, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Figure 1:
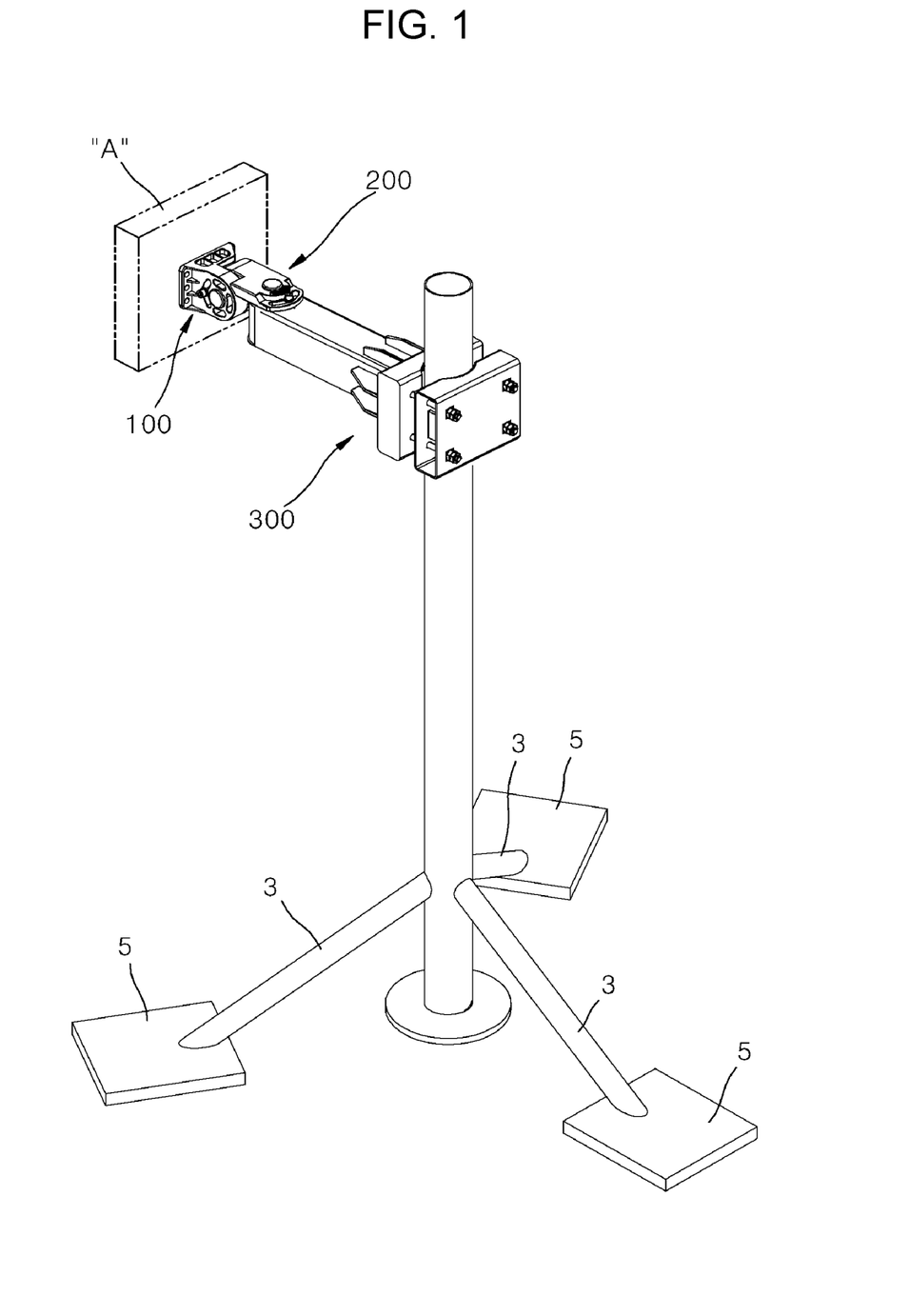
FIG. 1 is a perspective view illustrating an example of a state in which an antenna device is installed in an embodiment of a clamping apparatus for an antenna according to the present disclosure.
Figure 2:
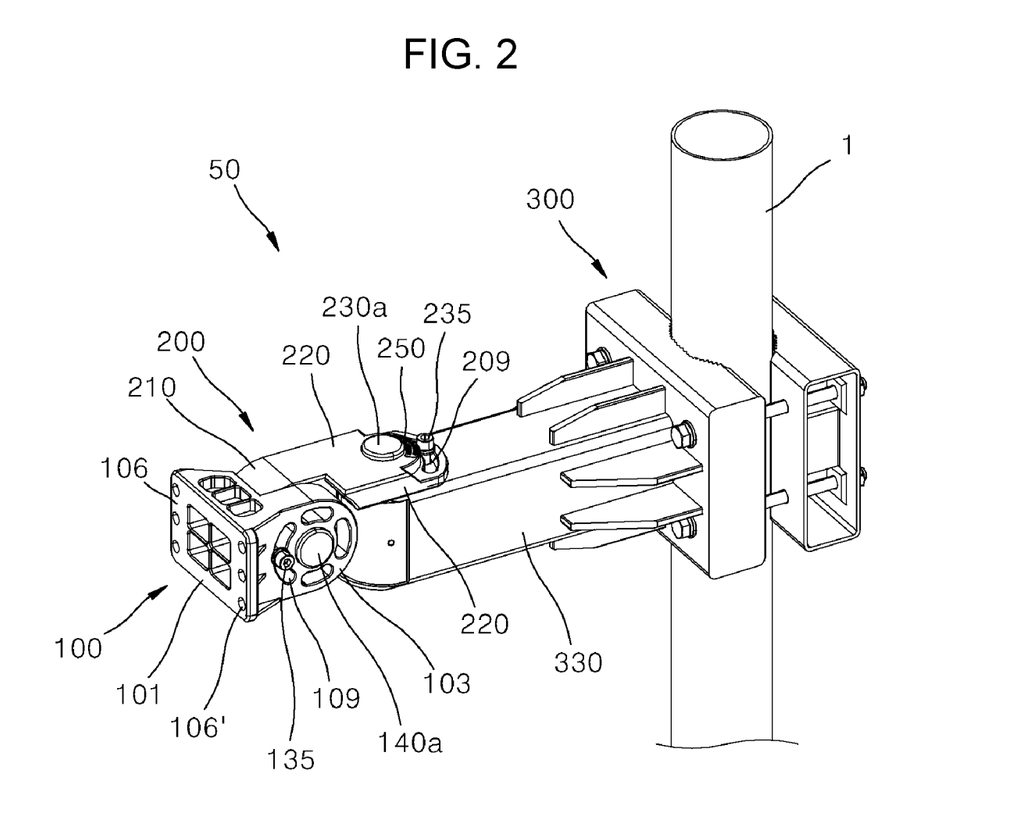
FIG. 2 is a perspective view illustrating an embodiment of a clamping apparatus for an antenna according to the present disclosure.
Figure 3:
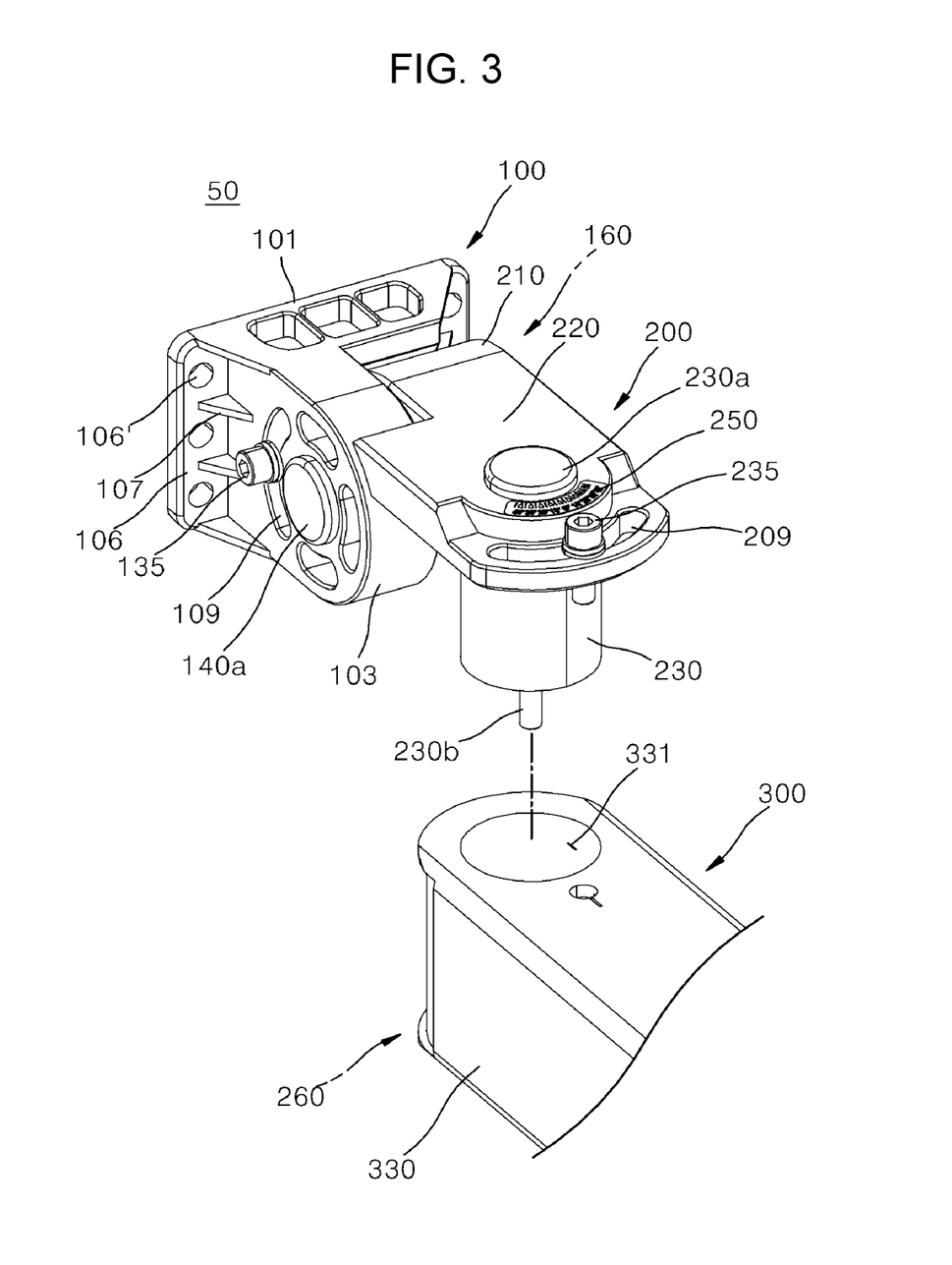
FIG. 3 is an exploded perspective view illustrating installation of the clamping apparatus of FIG. 2.
Figure 4:
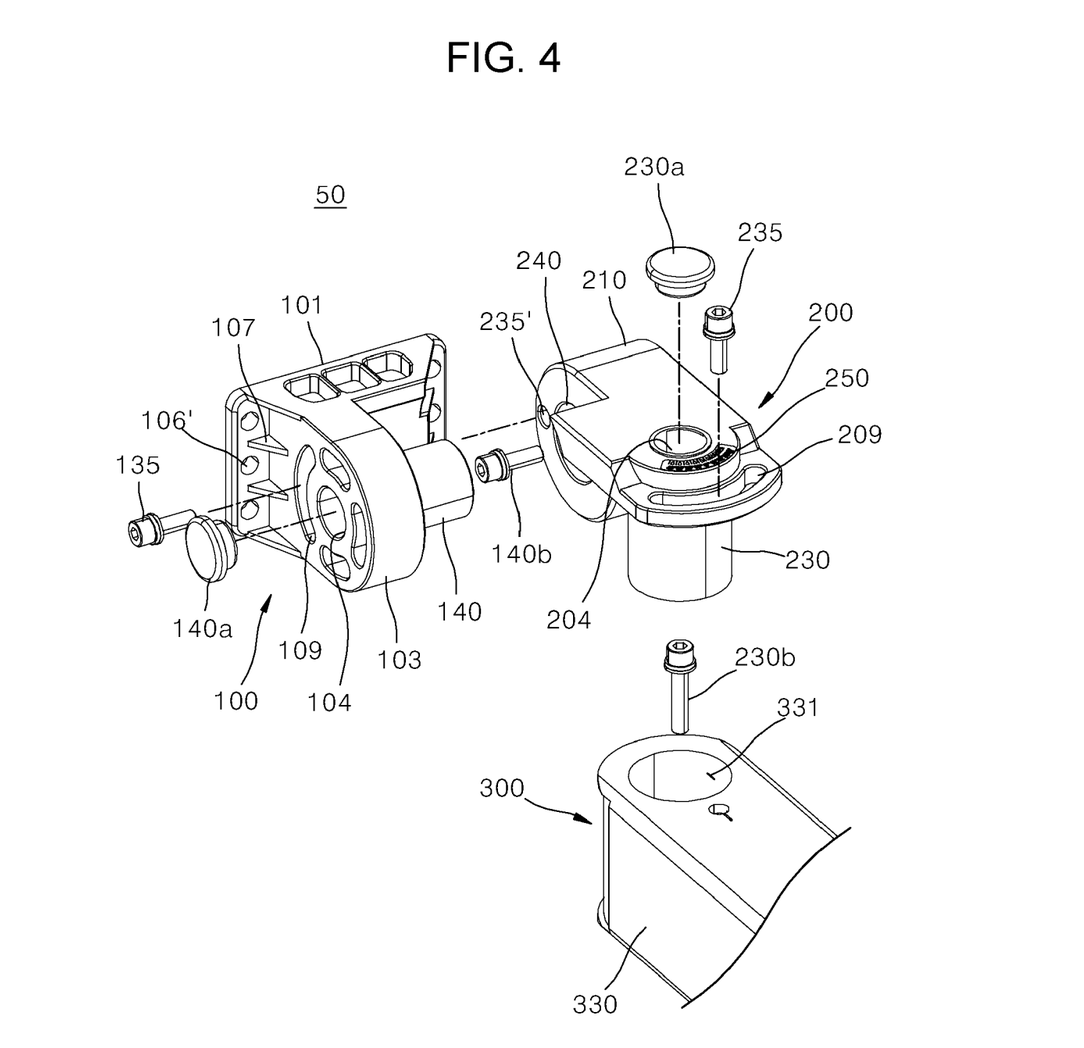
FIG. 4 is an exploded perspective view illustrating a tilting unit and a rotation unit among the components of FIG. 2.
Figure 5:
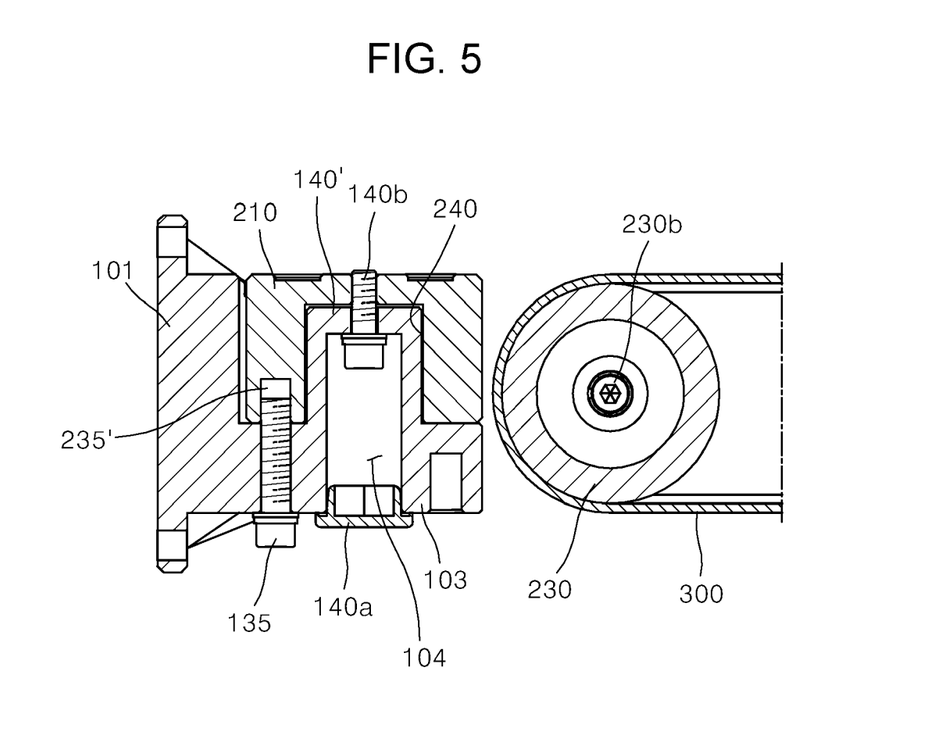
FIG. 5 is a horizontal sectional view illustrating a part of the clamping apparatus for an antenna according to the present disclosure.
Figure 6:
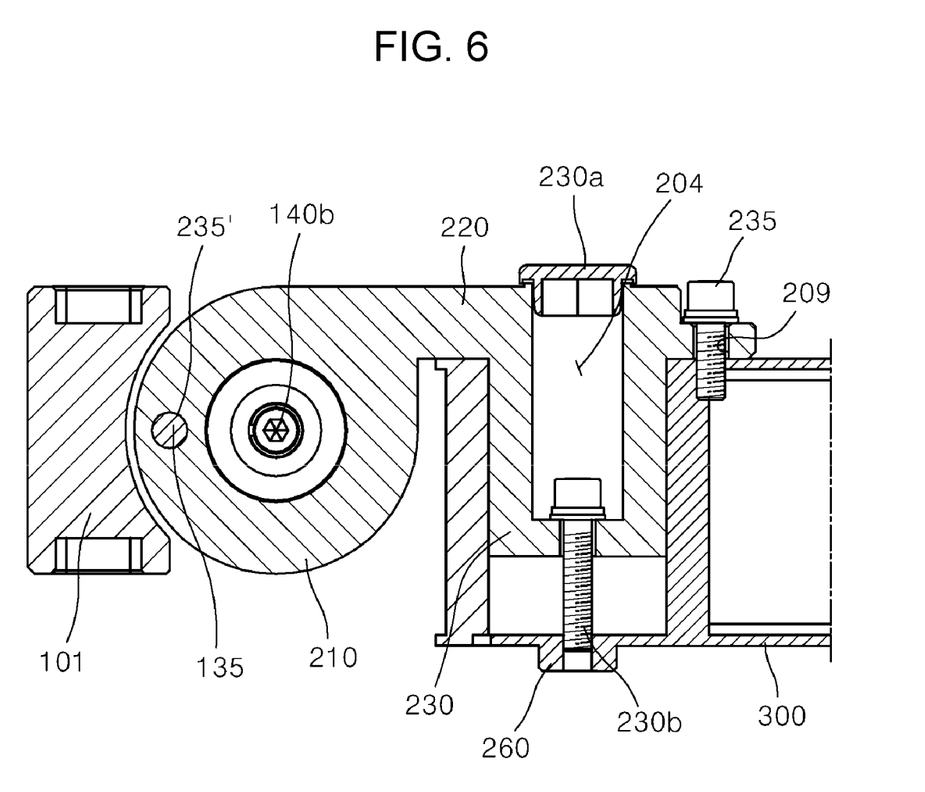
FIG. 6 is a vertical sectional view illustrating a part of the clamping apparatus for an antenna according to the present disclosure.

FIG. 1 is a perspective view illustrating an example of a state in which an antenna device is installed in an embodiment of a clamping apparatus for an antenna according to the present disclosure. FIG. 2 is a perspective view illustrating an embodiment of a clamping apparatus for an antenna according to the present disclosure. FIG. 3 is an exploded perspective view illustrating installation of the clamping apparatus of FIG. 2. FIG. 4 is an exploded perspective view illustrating a tilting unit and a rotation unit among the components of FIG. 2. FIG. 5 is a horizontal sectional view illustrating a part of the clamping apparatus for an antenna according to the present disclosure. FIG. 6 is a vertical sectional view illustrating a part of the clamping apparatus for an antenna according to the present disclosure.

Referring to FIGS. 1 to 6, an embodiment of a clamping apparatus 50 for an antenna according to the present disclosure includes an arm unit 300 that is coupled to a support pole 1, a rotation unit 200 that is coupled with the arm unit 300 and is coupled to be rotatable about the arm unit 300 in a left-right direction, and a tilting unit 100 that is coupled to the rotation unit 200 and is coupled to be tiltable in an up-down direction while mediating coupling of an antenna device A.

The arm unit 300 serves to mediate coupling of the antenna device A to the support pole 1. The antenna device A coupled by the clamping apparatus 50 for an antenna according to an embodiment of the present disclosure may be an antenna device A to which the Massive MIMO technology or the FD-MIMO technology in which the 3D-Beamforming is possible, which is introduced in the "Background Art" described previously, is applied.

This arm unit 300 may be formed in such a form that it is substantially coupled to one side and the other side of an outer circumferential surface of the support pole 1 by bolting and that it extends at a predetermined length in a direction perpendicular to a lengthwise direction of the support pole 1 and the antenna device A is installed apart from the support pole 1 by a predetermined length.

Referring to FIG. 1, the support pole 1 may further include multiple support rods 3 that slantly extend downward from the outer circumferential surface of the support pole 1 and radially extend to be apart from one another by a predetermined angle, and support panels 5 that are provided at tips of the multiple support rods 3 and are supported and coupled to the ground or the surface of a wall.

The multiple support rods 3 may not only be fixed to the support pole 1 by a welding method and be formed integrally with the support pole 1, but also be separately manufactured and coupled to the support pole 1 by various coupling methods such as a bolting method.

Further, the support panels 5 may include bolt fastening holes (not illustrated) so as to be coupled to the ground or the surface of the wall using fastening members such as bolts. In an embodiment of the present disclosure, the support panels 5 are provided in a panel shape.

However, according to an embodiment, the support panels 5 are provided in the shape of a block having predetermined weight, and may be designed to provide stable supporting while serving as weights at three positions on a floor of an installation place.

The rotation unit 200 may be coupled to a front end of the arm unit 300 so as to be rotatable in a left-right direction. The rotation unit 200 is rotated about the front end of the arm unit 300 in a left-right direction, thereby serving to substantially facilitate directivity design of the left-right direction of the antenna device A coupled to the tilting unit 100.

Moreover, the tilting unit 100 may be coupled to a front end of the rotation unit 200 so as to be tiltable in an up-down direction. The tilting unit 100 is tilted about the front end of the rotation unit 200 in an up-down direction, thereby serving to substantially facilitate directivity design of the up-down direction of the antenna device A coupled to the tilting unit 100.

In this way, an embodiment of the clamping apparatus 50 for an antenna according to the present disclosure enables angle fixation with respect to a radiation direction of frequencies radiated from a front surface of the antenna device A coupled to the support pole 1 by rotating the antenna device A in a left-right direction using the rotation unit 200, as well as by tilting the antenna device A in an up-down direction using the tilting unit 100. A state of the angle fixation caused by the rotation unit 200 and the tilting unit 100 will be described below in greater detail.

Hereinafter, for the convenience of understanding, the description will be made by defining a front direction of the antenna device A as "front", defining the opposite direction as "rear", defining a left side of the front as "leftward direction" and a right side of the front as "rightward direction", and defining an upper side of the antenna device A as "upward direction" and a lower side of the antenna device A as "downward direction".

Hereinafter, the description will be made in greater detail from a component adjacent to the antenna device A.

Referring to FIGS. 1 to 4, the antenna device A is coupled to a front end of the tilting unit 100. More specifically, the antenna device A is coupled to the front end of the tilting unit 100, and in this state, the tilting unit 100 is tiltably coupled to the front end of the rotation unit 200. In this state, referring to FIG. 3, a rotating shaft rod 230 of the rotation unit 200 is inserted and placed in a rotating shaft hole 331 that is provided in the front end of the arm unit 300 fixed to the support pole 1, whereby, referring to FIG. 2, the installation of the antenna device A based on an embodiment of the clamping apparatus 50 for an antenna according to the present disclosure can be completed.

Here, referring to FIGS. 3 and 4, the tilting unit 100 may include an antenna coupling stage 101 that is coupled with the antenna device A, and a tilting coupling stage 103 that is coupled to come into surface contact with one outer lateral surface or the other outer lateral surface of the rotation unit 200.

The tilting unit 100 has a horizontal cross section having an approximate "L" shape on the whole, and the antenna coupling stage 101 and the tilting coupling stage 103 may be integrally formed. The antenna coupling stage 101 may be vertically disposed in a left-right direction so as to substantially come into close contact with a rear surface of the antenna device A, and the tilting coupling stage 103 may be vertically disposed to extend backward from a right end of the antenna coupling stage 101 at a predetermined length.

The antenna coupling stage 101 is a part that comes into close contact with the rear surface or a lateral surface of the antenna device A and has bolt through-holes 106' formed to be able to be bolted by fastening bolts (not illustrated). Referring to FIG. 4, three bolt through-holes 106' may be formed in bolt fastening stages 106 of left and right ends of the antenna coupling stage 101 so as to be spaced apart from one another up and down by a predetermined distance. The clamping apparatus 50 for an antenna according to an embodiment of the present disclosure adopts, but not necessarily limited to, a structure in which the antenna coupling stage 101 comes into close contact with the rear surface of the antenna device A and the bolt through-holes 106' are formed across in a front-rear direction. A structure may be naturally adopted in which, when an area of the antenna coupling stage 101 is formed larger than that of the rear surface of the antenna device A, the bolt fastening stages 106 extend to be bent to the lateral surfaces of the antenna device A and come into close contact with the lateral surfaces of the antenna device A, and the bolt through-holes 106' are across in a left-right direction.

Multiple reinforcement ribs 107 are provided between the tilting coupling stage 103 and the antenna coupling stage 101, and can improve durability by reinforcing a mechanical fatigue caused by weight of the antenna device A or wind around the antenna device A.

The tilting coupling stage 103 may be provided with a tilting guide 109 so as to guide a tilting motion of the tilting unit 100 on an outer lateral surface thereof opposite to an inner lateral surface thereof which comes into close contact with a right lateral surface of the front end of the rotation unit 200. The tilting guide 109 may be formed on the same circumference centering on a tilting shaft rod 140 in a slot hole shape. Referring to FIG. 5, this tilting guide 109 may be formed such that it passes through the tilting coupling stage 103 in a left-right direction and a tilting guide bolt 135 (to be described below) is fixed to the end of the rotation unit 200.

In addition, referring to FIG. 4, the tilting coupling stage 103 may be configured such that the tilting shaft rod 140 is provided to extend toward the right lateral surface of the front end of the rotation unit 200 so as to serve as the center of a tilting motion of the tilting unit 100 on the inner lateral surface thereof which comes into close contact with the right lateral surface of the front end of the rotation unit 200. The tilting shaft rod 140 may be inserted into a part of the inner lateral surface of the rotation unit 200 (to be described below) so as to correspond to a shape so that it can not only become the center of the tilting motion of the tilting unit 100 but also serve to indirectly guide the tilting motion because it has a shape corresponding surface over a wide area in a relationship with the rotation unit 200.

Referring to FIG. 4, the tilting shaft rod 140 may couple the tilting unit 100 to the rotation unit 200 via the tilting coupling means.

More specifically, the tilting coupling means may be provided as a tilting fixing bolt 140b that fixes the tilting unit 100 so as to be maintained after the tilting unit 100 is tilted and adjusted to a preset angle. The tilting fixing bolt 140b may be a bolt that passes through a tilting central hole 104 of the tilting coupling stage 103 (to be described below) and the tilting shaft rod 140 and is fixedly coupled to the rotation unit 200.

However, the tilting coupling means need not be necessarily provided as the tilting fixing bolt 140b. That is, although not illustrated in the drawings, a haptic stopping structure (not illustrated) which, after being coupled with the tilting shaft rod 140, enables the tilting unit 100 to be tilted in one or the other of upward and downward directions and to be stopped as long as a constant external force is not provided at each predetermined angle may be provided inside the rotation unit 200. Here, the tilting fixing bolt 140b may be one fastening means for coupling the tilting unit 100 with the haptic stopping structure (not illustrated).

More specifically, the tilting coupling means may include the haptic stopping structure (not illustrated) that does not only function as a fixing means for coupling the tilting shaft rod 140 to the rotation unit 200 via the tilting fixing bolt 140b that passes through the tilting central hole 104 formed in the center of the tilting coupling stage 103, but is also provided inside the tilting fixing bolt 140b and the rotation unit 200 coupled via the tilting fixing bolt 140b.

As described above, at least one tilting guide 109 formed in a slot hole shape may be formed on the same circumference centering on the center of the tilting coupling stage 103. The tilting guide 109 may be one of multiple slot holes formed in the same circumference outside the tilting central hole 104. The tilting guide 109 may serve to guide tilting of the tilting unit 100 and to restrict a tilting amount of the tilting unit 100 by a tilting guide bolt 135 that passes through the tilting guide 109 and is coupled to the rotation unit 200. For example, when the tilting unit 100 is tilted about the tilting fixing bolt 140b in an upward direction, the tilting guide bolt 135 is caught on a lower end of the tilting guide 109, and upward tilting may be restricted. When the tilting unit 100 is tilted about the tilting fixing bolt 140b in a downward direction, the tilting guide bolt 135 is caught on an upper end of the tilting guide 109, and downward tilting may be restricted.

A tilting-side dust cap 140a may be detachably provided on an outer end of the tilting central hole 104 of the tilting coupling stage 103. When the coupling of the tilting unit 100 to the rotation unit 200 and the adjustment of the tilting angle of the haptic stopping structure (to be described below) are required, the tilting-side dust cap 140a not only enables a user to open the tilting central hole 104 to approach the tilting fixing bolt 140b but also can prevent foreign materials such as dust from flowing into the tilting central hole 104 from the outside at ordinary times.

Meanwhile, referring to FIG. 4, an embodiment of the clamping apparatus 50 for an antenna according to the present disclosure may further include the tilting guide bolt 135 that passes through the tilting guide 109 formed at the tilting coupling stage 103 and is fastened and fixed to the rotation unit 200.

After the tilting guide bolt 135 is fixed to the rotation unit 200, when the tilting unit 100 is tilted at a predetermined angle in an up-down direction, the tilting guide bolt 135 is caught on inner walls of one end and the other end of the tilting guide 109, thereby serving to physically restrict the tilting amount of the tilting unit 100.

Here, the slot hole of the tilting guide 109 is formed on the same circumference concentric about the tilting shaft rod 140, and may be formed to have a circumferential surface along which the tilting unit 100 can be tilted upward and downward at a maximum angle of 40 degrees. Accordingly, the tilting unit 100 can be tilted within a range of a tilting angle of a total of 80 degrees in an up-down direction.

When the tilting of the antenna device A in an up-down direction is required of the antenna coupling stage 101, the tilting amount of the tilting unit 100 configured in this way is adjusted by applying a manual force of a worker or an external force suitable for the haptic stopping structure, in a state in which the coupling of the tilting unit 100 and the rotation unit 200 is loosely released using the tilting fixing bolt 140b of the tilting coupling means, to the tilting unit 100, and then the tilting unit 100 is firmly fixed at the corresponding tilting angle using the tilting fixing bolt 140b. Thereby, the antenna device A can be adjusted to be tilted in an up-down direction.

Referring to FIGS. 4 and 6, the rotation unit 200 may include a tilting unit installing stage 210 to which the tilting unit 100 is titably coupled, and a rotating block 220 at which a rotating shaft rod 230 inserted into a rotating shaft hole 331 formed in the arm unit 300 is formed.

Here, the tilting unit installing stage 210 is a portion that is installed to come into close contact with the tilting coupling stage 103 of the tilting unit 100, and may conceptually include a right lateral surface of a front end of the rotating block 220. In the case of the clamping apparatus 50 for an antenna according to an embodiment of the present disclosure, the tilting unit installing stage 210 is provided on the right lateral surface of the rotating block 220. However, when the tilting coupling stage 103 of the tilting unit 100 is provided in the opposite direction, the tilting unit installing stage 210 may be provided on a left lateral surface of the rotating block 220.

Referring to FIG. 5, the tilting unit installing stage 210 may be provided with a tilting shaft rod installing hole 240 which is recessed in the center thereof in a left-right direction and into which the tilting shaft rod 140 of the tilting unit 100 is inserted. Either a fixing hole (with no reference numeral) into which the tilting shaft rod 140 of the tilting unit 100 is inserted and seated and in which the tilting fixing bolt 140b is fixedly installed inside the tilting shaft rod installing hole 240 or a haptic stopping structure (not illustrated) acting as a tilting coupling means may be provided in the tilting shaft rod installing hole 240.

Referring to FIG. 5, a tilting guide bolt fixing hole 235' into which an end of the tilting guide bolt 135 of the tilting unit 100 is inserted and fixed may be formed outside the tilting shaft rod installing hole 240 of the tilting unit installing stage 210. The tilting guide bolt 135 passing through the tilting guide 109 of the tilting unit 100 from the outside is fastened and fixed to the tilting guide bolt fixing hole 235', and a worker can estimate the tilting amount of the tilting unit 100 according to a position of the tilting guide bolt 135 in the tilting guide 109 that is relatively moved when the tilting unit 100 is tilted.

Referring to FIGS. 4 and 6, in an embodiment of the clamping apparatus 50 for an antenna according to the present disclosure, the rotation unit 200 may further include a rotating shaft rod 230 that is integrally or separately manufactured and is coupled under a rear end of the rotating block 220.

The rotating shaft rod 230 is a portion which is inserted into a rotating shaft hole 331 that is provided in a front end of a clamp arm 330 (to be described below) of the arm unit 300 in a circular hollow shape so as to be upwardly open and which enables the rotation unit 200 to be tilted about the rotating shaft hole 331 in a left-right direction.

A rotating guide 209 may be provided at a rear end of the rotating block 220 so as to guide a rotating motion of the rotation unit 200 in a left-right direction. The rotating guide 209 may be formed on the same circumference centering on the rotating shaft rod 230 in a slot hole shape. Referring to FIG. 6, the rotating guide 209 may be formed such that a rotating guide bolt 235 (to be described below) passes through the rear end of the rotating block 220 in an up-down direction and is fixed to the arm unit 300. The rotating guide 209 may serve to restrict the rotating amount of the rotation unit 200 by means of the rotating guide bolt 235 (to be described below) that is coupled to pass through the rotating guide 209.

Furthermore, the rotating shaft rod 230 provided at the rear end of the rotating block 220 may be provided to extend downward from a lower surface of the rear end of the rotating block 220 at a predetermined length. The rotating shaft rod 230 may be inserted into the rotating shaft hole 331, which is formed in the front end of the clamp arm 330 (to be described below) of the arm unit 300 so as to be upwardly open, so as to correspond to a shape, and serve as the center of the rotating motion. In addition, the rotating shaft rod 230 may serve to indirectly guide the rotating motion because it has a shape corresponding surface over a wide area in a relation with the rotating shaft hole 331 of the clamp arm 330.

A rotating central hole 204, which passes through the rear end of the rotating block 220 in an up-down direction and passes through the rotating shaft rod 230, may be formed in the rear end of the rotating block 220.

Referring to FIG. 4, the rotating shaft rod 230 may couple the rotation unit 200 to the clamp arm 330 of the arm unit 300 via a rotating coupling means.

More specifically, the rotating coupling means may be provided as a rotating fixing bolt 230b that fixes the rotation unit 200 so as to be maintained after the rotation unit 200 is rotated and adjusted to a preset angle. The rotating fixing bolt 230b may be a bolt that passes through the rotating central hole 204 and the rotating shaft rod 230 and is coupled and fixed to the clamp arm 330 of the arm unit 300.

Like the above-described tilting coupling means, the rotating coupling means is also not necessarily provided as the rotating fixing bolt 230b, and may include a haptic stopping structure (not illustrated). Hereinafter, when compared with the tilting coupling means, the rotating coupling means has a difference in an installed position only, and a structure that couples the rotation unit 200 and the arm unit 300 in the same way as the structure that couples the tilting unit 100 and the rotation unit 200. Thus, detailed description thereof will be replaced with the description of the tilting coupling means.

Referring to FIG. 4, an embodiment of the clamping apparatus 50 for an antenna according to the present disclosure may further include the rotating guide bolt 235 that passes through the rotating guide 209 formed in the rotating block 220 and is fastened and fixed to the front end of the clamp arm 330 of the arm unit 300.

When the rotating guide bolt 235 is fixed to the clamp arm 330 of the arm unit 300 and when the rotation unit 200 is rotated at a predetermined angle in a left-right direction, the rotating guide bolt 235 is caught on inner walls of one end and the other end of the rotating guide 209, thereby serving to physically restrict a rotating amount of the rotation unit 200.

Here, a slot hole of the rotating guide 209 is formed on the same circumference concentric about the rotating shaft rod 230, and may be formed to have a circumferential surface along which the rotation unit 200 can be rotated leftward and rightward at a maximum angle of 40 degrees. Accordingly, the rotation unit 200 can be rotated within a range of a rotating angle of a total of 80 degrees in a left-right direction.

Meanwhile, a rotating-side dust cap 230a may be detachably provided on an outer end of the rotating central hole 204 of the rotating block 220. When the coupling of the rotation unit 200 to the arm unit 300 and the adjustment of the rotating angle of the haptic stopping structure (to be described below) are required, the rotating-side dust cap 230a not only enables a user to open the rotating central hole 204 to approach the rotating fixing bolt 230b but also can prevent foreign materials such as dust from flowing into the rotating central hole 204 from the outside at ordinary times.

When the rotating of the antenna device A coupled to the tilting unit 100 in a left-right direction is required, the rotating amount of the rotation unit 200 configured in this way is adjusted by applying a manual force of a worker or an external force suitable for the haptic stopping structure, in a state in which the coupling of the rotation unit 200 and the arm unit 300 is loosely released using the rotating fixing bolt 230b of the rotating coupling means, to the rotation unit 200, and then the rotation unit 200 is firmly fixed at the corresponding rotating angle using the rotating fixing bolt 230b. Thereby, the antenna device A can be adjusted to be rotated in a left-right direction.

Meanwhile, a rotating angle label 250, which indicates a position of the rotating guide bolt 235 rotated relatively in the slot shole from a reference point by an angle, may be attached to an upper surface of the rotating block 220 which corresponds to a front end or a rear end of the rotating guide 209.

Here, the reference point of the position of the rotating guide bolt 235 refers to a horizontal state in which the rotating motion of the rotation unit 200 is not performed, and is indicated by "0 degree". The rotating angle of the rotation unit 200 may be indicated at angle intervals of 5 degrees or 10 degrees with respect to leftward rotation and rightward rotation.

Figure 7:
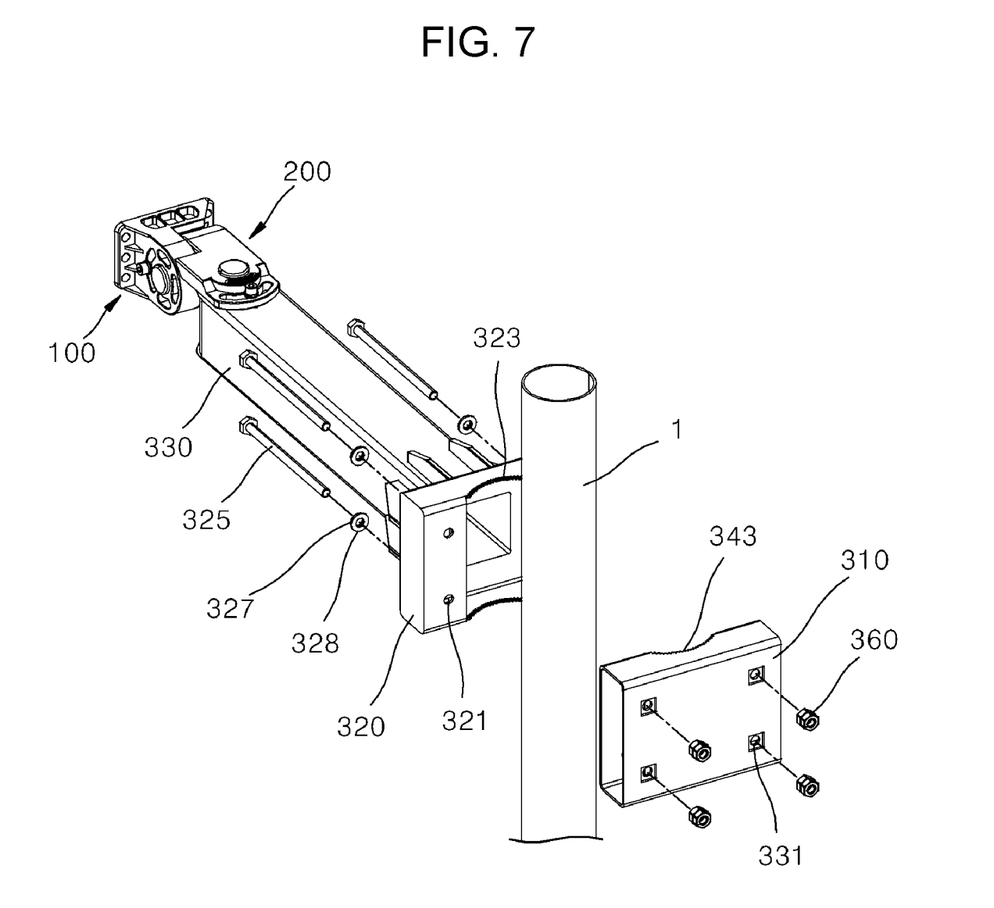
FIG. 7 is an exploded perspective view illustrating an arm unit among the components of FIG. 2.

FIG. 7 is an exploded perspective view illustrating the arm unit of the components of FIG. 2.

Referring to FIG. 7, the arm unit 300 may include an outer mounting block 310 that is disposed to come into close contact with one side of an outer circumferential surface of the support pole 1, an inner mounting block 320 that is disposed to come into close contact with the other side of the outer circumferential surface of the support pole 1 and is fixed with the outer mounting block 310 by at least one fixing bolt 325, and a clamp arm 330 that extends from the inner mounting block 320 at a predetermined length in a direction orthogonal to the support pole 1 and constitutes a front end to which the rotating shaft hole 331 is provided.

The outer mounting block 310 may be formed of a steel material, and may form a frame. An outer shape-fitting recess 343, which is a portion that substantially corresponds to a shape of the one side of the outer circumferential surface of the support pole 1, may be formed in the outer mounting block 310. Although not illustrated in the drawings, the outer shape-fitting recess 343 is provided in a support block (not illustrated) which is formed of an elastic material having a high friction force such that no slip is generated between the support block and the support pole 1 to come into close contact, and can be substantially coupled to be disposed between the support block and the support pole 1.

At least one outer bolt through-hole 311 through which the fixing bolt 325 passes may be formed in left and right opposite ends of the outer mounting block 310 so as to be spaced up and down. Here, the outer mounting block 310 is formed of a metal material having a hollow hexahedral shape, and the outer bolt through-holes 311 may be formed in front and rear end faces of the outer mounting block 310 at corresponding positions such that the fixing bolts 325 can completely pass through the outer mounting block 310 in a front-rear direction.

The outer mounting block 310, the support block 340, and the inner mounting block 320 are fastened such that the fixing bolts 325 pass through inner bolt through-holes 321 and the outer bolt through-holes 311 from the inner mounting block 320 side in turn, and then are firmly fastened using fastening nuts 360, whereby the antenna device A can be stably supported.

Here, referring to FIG. 7, the fastening nuts 360 may be fastened to ends of the fixing bolts 325 which are exposed to a rear surface of the outer mounting block 310. Although not illustrated in the drawings, the fastening nuts 360 may be fastened to an empty space between front and rear surfaces of the outer mounting block 310 in a hidden state, and thereby can be provided such that arbitrary disassembly is made difficult by a third person.

Among the components of the outer mounting block 310, the outer shape-fitting recess 343, which is a portion that substantially comes into close contact with one side of the outer circumferential surface of the support pole 1, may be formed to be recessed in a shape corresponding to the outer circumferential surface of the support pole 1 in order to improve a close contact area with respect to the support pole 1 having a circular horizontal cross section. In addition, the outer shape-fitting recess 343 may be subjected to serration machining such that multiple serration ribs are formed for a stronger friction force while being compressed on the outer circumferential surface of the support pole 1 by a fastening force from the fixing bolts 325 and the fastening nuts 360.

In addition, an inner shape-fitting recess 323 corresponding to the outer shape-fitting recess 343 of the outer mounting block 310 may be formed in an outer lateral surface of the inner mounting block 320, i.e. a surface that substantially comes into close contact with the support pole 1. The inner mounting block 320 is formed of a steel material for support stiffness. However, regardless of this, the inner shape-fitting recess 323 may also be subjected to serration machining such that multiple serration ribs are formed to prevent a slip from being generated between the inner mounting block 320 and the support pole 1.

The inner mounting block 320 and the clamp arm 330 may be integrally molded. Here, the inner mounting block 320 may be formed such that an up-down-left-right area (i.e., a front area) thereof is relatively larger than that occupied by the clamp arm 330. In contrast, depending on an embodiment, a front end of the clamp arm 330 may be formed to have various distances spaced apart from the support pole 1.

When a length of the clamp arm 330 is relatively short, weight of the antenna device A can be sufficiently supported by an integral molding method of a connection portion between the inner mounting block 320 and the clamp arm 330. However, when the length of the clamp arm 330 is relatively long, at least one reinforcement rib 380, as illustrated in FIG. 5, may be formed at the connection portion between the inner mounting block 320 and the clamp arm 330.

Figure 8:
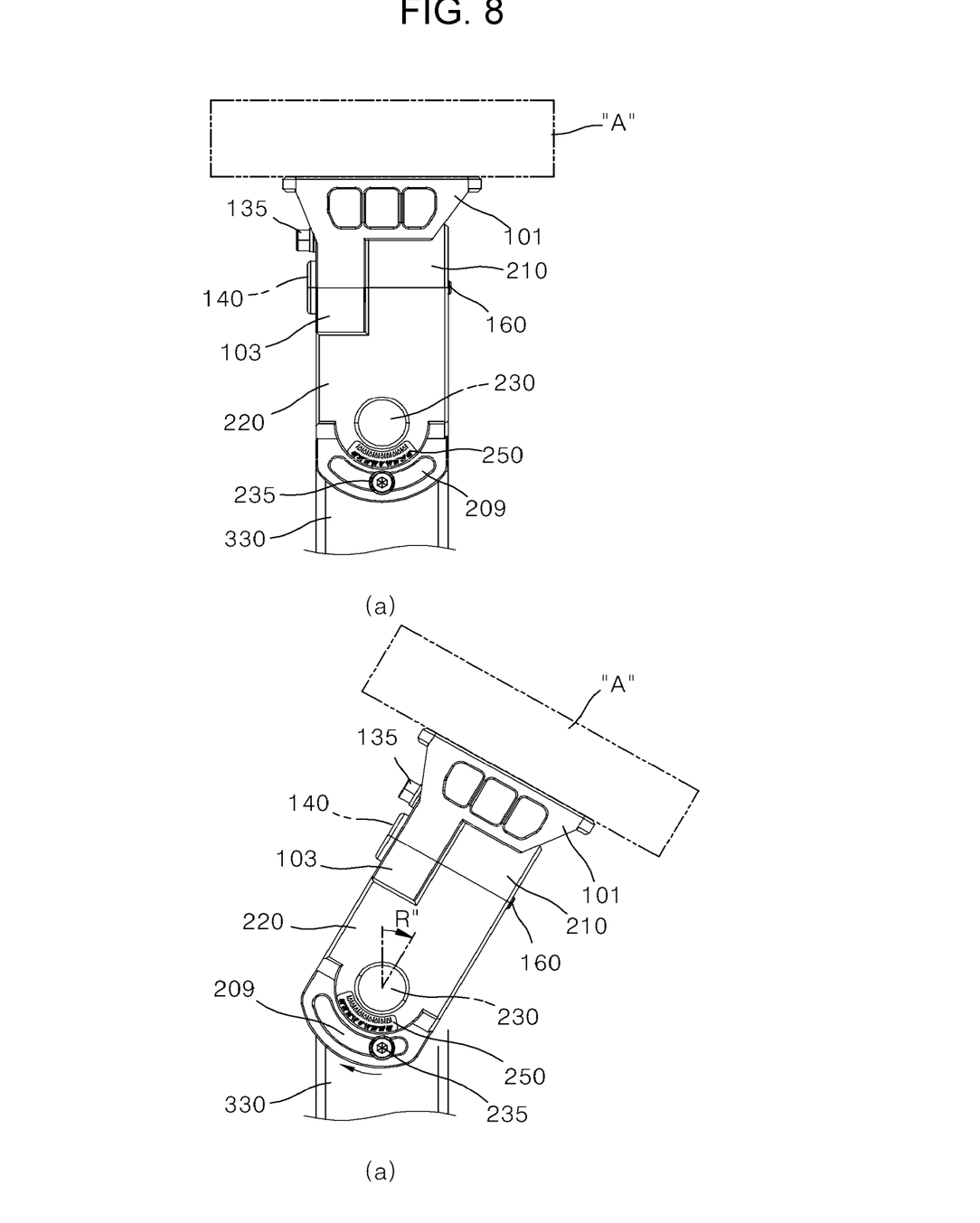
FIG. 8 is a top view of FIG. 2 which illustrates a rotating motion caused by the rotation unit.
Figure 9:
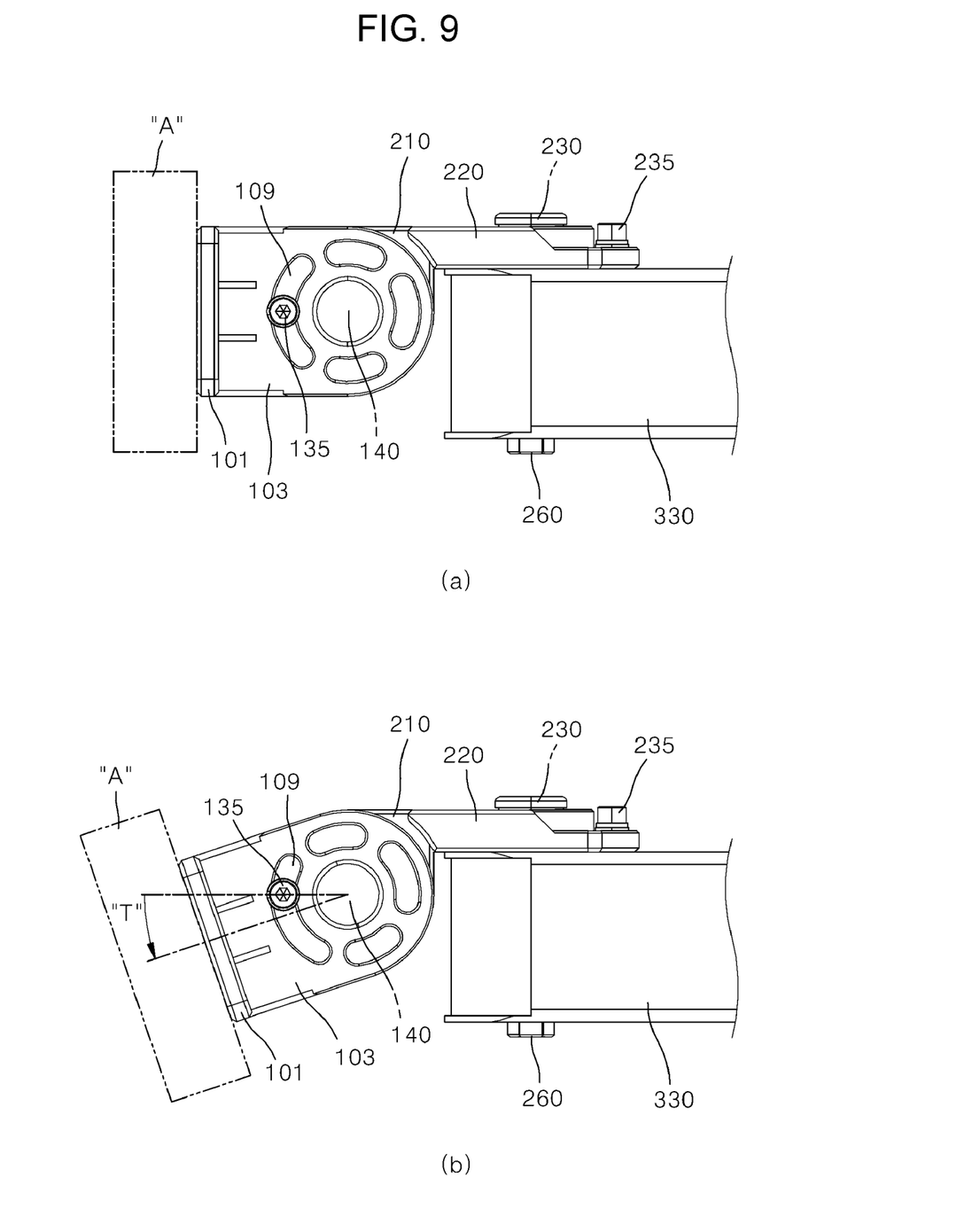
FIG. 9 is a side view of FIG. 2 which illustrates a tilting motion caused by the tilting unit.

FIG. 8 is a top view of FIG. 2 which illustrates a rotating motion caused by the rotation unit, and FIG. 9 is a side view of FIG. 2 which illustrates a tilting motion caused by the tilting unit.

The rotating and tilting motions of the clamping apparatus 50 for an antenna according to an embodiment of the present disclosure will be described below in greater detail with reference to FIGS. 8 and 9.

First, as to the rotating motion, in a state in which the antenna device A is coupled to the front end of the tilting unit 100, when a predetermined external force is applied to the antenna device A or the rotation unit 200 as illustrated in FIG. 8, the antenna device A or the rotation unit 200 can be rotated in a left-right direction by uncoupling the rotating coupling means, and be firmly fixed at a preset rotating angle through the rotating coupling means.

In this case, predetermined moment based on the support pole 1 is applied to the rotation unit 200 including the antenna device A, but the outer shape-fitting recess 343 and the inner shape-fitting recess 323 are formed in the arm unit 300 by serration machining and are firmly coupled to the support pole 1 in close contact with the support pole 1, whereby arbitrary movement during the rotating motion can be prevented.

Next, as to the tilting motion, in a state in which the antenna device A is coupled to the front end of the tilting unit 100, when a predetermined external force is applied to the antenna device A or the tilting unit 100 as illustrated in FIG. 9, the tilting unit 100 is tilted in such a way that the tilting guide bolt 135 is relatively tilted within a range of the slot hole restricted by the tilting guide 109 on the basis of the tilting shaft rod 140.

After the tilting angle for the antenna device A is adjusted, tilting unit 100 can be firmly fixed at a preset tilting angle using the tilting coupling means.

Undescribed reference numerals 160 and 260 illustrated in FIGS. 8 and 9 indicate fastening means for fixing ends of the tilting fixing bolt 140*b* and the rotating fixing bolt 230*b*. The fastening means 160 and 260 may be provided in the shape of a fixing bush having internal threads (not illustrated) fastened with external threads (not illustrated) formed on outer circumferential surfaces of ends of the tilting fixing bolt 140*b* and the rotating fixing bolt 230*b*.

An embodiment of the clamping apparatus for an antenna according to the present disclosure has been described in detail with reference to the accompanying drawings. However, it goes without saying that embodiments of the present disclosure are not necessarily restricted by the embodiment described above and can be modified and carried out in an equivalent range by those skilled in the art to which the present disclosure pertains. Therefore, the scope of rights of the present disclosure will be defined by the following claims.

INDUSTRIAL APPLICABILITY

The present disclosure provides a clamping apparatus for an antenna which can increase a degree of freedom of installation with respect to a support pole having many spatial limitations and improve workability.

What is claimed is:

1. A clamping apparatus for an antenna comprising:
    an arm unit that is coupled to a support pole and has an upwardly open rotating shaft hole formed in a front end thereof;
    a rotation unit that is detachably mounted in the rotating shaft hole of the arm unit and is coupled to be rotatable about the rotating shaft hole at a predetermined angle in a left-right direction; and
    a tilting unit which is detachably coupled to a tilting shaft hole of a front end of the rotation unit and is coupled to be tiltable about the tilting shaft hole at a predetermined angle in an up-down direction,
    wherein the rotation unit is configured such that a rotating shaft rod serving as the center of a rotating motion is rotatably fixed to the arm unit via a rotating coupling means, and
    wherein the tilting unit is configured such that a tilting shaft rod serving as the center of a tilting motion is tiltably fixed to the rotation unit via a tilting coupling means,
    wherein the tilting unit comprises:
        an antenna coupling stage that is coupled with an antenna device; and
        a tilting coupling stage that is coupled to come into close contact with a lateral surface of a front end of the rotation unit,
    the tilting coupling stage has a tilting guide formed in a slot hole shape on the same circumference centering on the tilting shaft rod so as to guide the tilting motion of the tilting unit, and
    wherein the tilting guide is provided between the tilting shaft rod and the antenna.

2. The clamping apparatus for an antenna according to claim 1,
    wherein the rotating coupling means includes a rotating fixing bolt that passes through a rotating central hole formed to pass through the rotating shaft rod and is fixed and fastened to the arm unit.

3. The clamping apparatus for an antenna according to claim 2,
    wherein the rotating fixing bolt is fastened and fixed to the arm unit corresponding to an interior of the rotating shaft hole.

4. The clamping apparatus for an antenna according to claim 1,
    wherein the tilting coupling means includes a tilting fixing bolt that passes through a tilting central hole formed to pass through the tilting shaft rod and is fixed and fastened to the rotation unit.

5. The clamping apparatus for an antenna according to claim 4,
    wherein the tilting fixing bolt is fastened and fixed to the rotation unit corresponding to an interior of the tilting shaft hole.

6. The clamping apparatus for an antenna according to claim 1,
    wherein the rotation unit comprises:
        a tilting unit installing stage to which the tilting unit is tiltably coupled; and
        a rotating block at which the rotating shaft rod inserted into and seated in the rotating shaft hole of the arm unit is formed, and
    wherein the rotating block has a rotating guide formed in a slot hole shape on the same circumference centering on the rotating shaft rod so as to guide the rotating motion of the rotation unit.

7. The clamping apparatus for an antenna according to claim 1,
    wherein the arm unit comprises:
        an outer mounting block that is disposed to come into close contact with one side of an outer circumferential surface of the support pole;
        an inner mounting block that is disposed to come into close contact with the other side of the outer circumferential surface of the support pole and is fixed with the outer mounting block by at least one fixing bolt; and
        a clamp arm that extends from the inner mounting block at a predetermined length in a direction orthogonal to the support pole and constitutes a front end in which the rotating shaft hole is provided.

8. The clamping apparatus for an antenna according to claim 7,
    wherein at least one reinforcement rib is formed at a connection portion between the inner mounting block and the clamp arm of the arm unit.

9. The clamping apparatus for an antenna according to claim 1,
    wherein a rotating angle label, which indicates a position of the rotating guide bolt moved relatively in the rotating guide slot from a reference point by an angle, is attached to an upper surface of the rotating block.

10. The clamping apparatus for an antenna according to claim 1,
    wherein the antenna coupling stage comes into surface contact with a plurality of places of any one of a rear surface and a lateral surface of the antenna device, and is fastened and fixed to fastening holes, which are formed in the plurality of places of any one of the rear surface and the lateral surface of the antenna device, via a fastening means.

11. The clamping apparatus for an antenna according to claim 1,
    wherein the support pole comprises:
        multiple support rods that slantly extend downward from an outer circumferential surface of the support pole and are radially spaced apart from one another at a predetermined angle; and
        support panels that are provided at tips of the multiple support rods and are supported and coupled to a ground or a wall.

* * * * *